US008856730B2

(12) United States Patent
Danton et al.

(10) Patent No.: US 8,856,730 B2
(45) Date of Patent: *Oct. 7, 2014

(54) DIAGRAM LAYOUT PATTERNS

(71) Applicant: Microsoft Corporation, Redmond, WA (US)

(72) Inventors: Stephen M. Danton, Seattle, WA (US);
Jordan C. Sehn, Redmond, WA (US);
Michael C. Murray, Seattle, WA (US);
Florian W. H. Voss, Seattle, WA (US);
Scott M. Roberts, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,919

(22) Filed: May 2, 2013

(65) Prior Publication Data

US 2013/0246910 A1 Sep. 19, 2013

Related U.S. Application Data

(63) Continuation of application No. 12/271,699, filed on Nov. 14, 2008, now Pat. No. 8,453,107.

(51) Int. Cl.
*G06F 9/44* (2006.01)
(52) U.S. Cl.
USPC ........................................................ 717/105
(58) Field of Classification Search
USPC ........................................................ 717/105
See application file for complete search history.

(56) References Cited

U.S. PATENT DOCUMENTS

| 6,470,482 | B1 | 10/2002 | Rostoker |
| 7,196,712 | B2 | 3/2007 | Rajarajan |
| 2005/0216883 | A1 | 9/2005 | Ishimitsu et al. |
| 2006/0161890 | A1 | 7/2006 | Green |
| 2006/0209085 | A1* | 9/2006 | Wong et al. .................. 345/629 |
| 2006/0282830 | A1* | 12/2006 | Kavalam et al. ............. 717/141 |
| 2007/0022399 | A1 | 1/2007 | Tsai |
| 2007/0300198 | A1 | 12/2007 | Chaplin |
| 2008/0189672 | A1* | 8/2008 | Shin et al. ...................... 716/19 |
| 2010/0125825 | A1 | 5/2010 | Danton et al. |

OTHER PUBLICATIONS

Maier et al., "A Pattern-Based Layout Algorithm for Diagram Editors", Electronic Communications of the EASST vol. 7, 2007, pp. 1-16.

(Continued)

*Primary Examiner* — Philip Wang
(74) *Attorney, Agent, or Firm* — Nicholas Chen; David Andrews; Micky Minhas

(57) ABSTRACT

Defining a layout of diagram elements can be performed in response to user input that includes one or more declarative statements specifying conditional patterns based on attributes of diagram elements, wherein the conditional patterns define layouts of diagram elements. Implementation of the layouts is dependent on conditions defined in the declarative statements and one or more values of one or more of the attributes. Implementations can further include organizing the conditional patterns as a pattern definition, wherein the pattern definition is stored on a computer readable medium in such a way that the pattern definition is retrievable by an application program that uses the pattern definition to evaluate the conditional patterns using values of attributes of one or more diagram elements. Representations of the diagram elements can be displayed according to the layouts when conditions for implementing the layouts are satisfied.

20 Claims, 5 Drawing Sheets

(56) References Cited

OTHER PUBLICATIONS

Minas, Mark, "Concepts and Realization of a Diagram Editor Generator Based on Hypergraph Transformation", Marcy 27, 2001, pp. 1-25.

Office Action dated Jun. 19, 2012 cited in U.S. Appl. No. 12/271,699.
Office Action dated Oct. 19, 2012 cited in U.S. Appl. No. 12/271,699.
Notice of Allowance dated Mar. 5, 2013 cited in U.S. Appl. No. 12/271,699.

* cited by examiner

DIAGRAM LAYOUT PATTERNS

CROSS-REFERENCE TO RELATED APPLICATIONS

This application is a continuation of U.S. patent application Ser. No. 12/271,699 filed on Nov. 14, 2008, entitled "DIAGRAM LAYOUT PATTERNS," which issued as U.S. Pat. No. 8,453,107 on May 28, 2013, and which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Computing systems can be used to create and can use diagrammatic representations. A diagram, generally, is a collection of one or more shapes and/or connecting lines. The diagrams can represent, for example, a workflow model, a business process model, or other flow or process. Shapes and connections or lines can be used for other purposes as well. Notably, lines, as used herein, are not necessarily single straight lines, but may also include rectilinear, curvilinear or other representations. Diagramming layout systems typically allow for free form definitions of diagrams, such as by user interaction with graphical representations of shapes and lines. Although existing systems provide rudimentary control over how the diagram responds given specific sets of data, e.g. a workflow diagram versus a business process model, they lack the ability to define rules on a "per node" or "per connection" basis.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of defining a layout of diagram elements. The method includes receiving user input. The user input includes one or more declarative statements specifying conditional patterns based on attributes of diagram elements. The conditional patterns define layouts of diagram elements. Implementation of the layouts is dependent on conditions defined in the declarative statements and one or more values of one or more of the attributes. The method further includes organizing the conditional patterns as a pattern definition. The pattern definition is stored on a computer readable medium. The pattern definition is stored such that the pattern definition is retrievable by an application program that uses the pattern definition to evaluate the conditional patterns using values of attributes of one or more diagram elements. The application is also configured to display representations of the diagram elements according to the layouts when conditions for implementing the layouts are satisfied.

Another embodiment includes a method which may be practiced in a computing environment. The method includes acts for facilitating defining a diagram layout. The method includes displaying a representation of a diagram, where the diagram includes one or more elements including one or more shapes or lines. The method further includes receiving user input. The user input includes one or more declarative statements specifying conditional patterns based on attributes of diagram elements. The conditional patterns are evaluated using attributes of the one or more shapes or lines. The representation of the diagram is updated based on evaluating the conditional patterns using attributes of the one or more shapes or lines. The updated representation of the diagram is displayed.

Yet another embodiment includes a method that may be practiced in a computing environment. The method includes acts for displaying diagrams. The method includes receiving one or more rules. The rules include one or more declarative statements specifying one or more conditional diagram layout patterns based on one or more attributes of diagram elements. The one or more rules are evaluated using one or more attributes of one or more elements of a diagram. Based on evaluating the one or more rules using one or more attributes of one or more elements of the diagram, a representation of the diagram is created and the representation of the diagram is displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
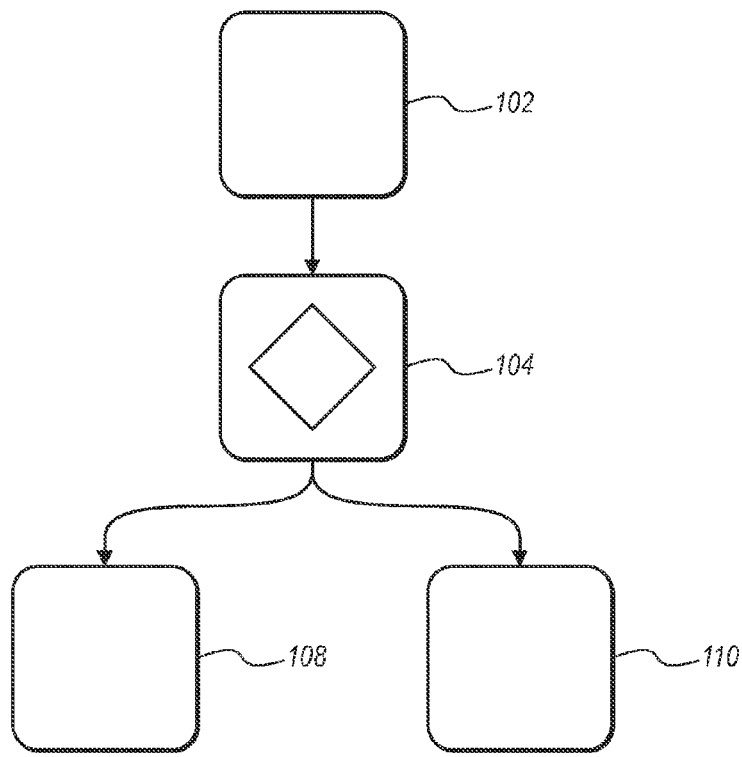
FIG. 1 illustrates an example of a diagram layout.

In some embodiments, layout patterns include user defined layout rules that apply only when the conditions of the pattern are met. In some embodiments, the conditions may be defined in metadata about shapes, lines, and/or diagrams (which include collections of one or more shapes and one or more lines). For example, a pattern may include rules that specify that decision diamond boxes should always have lines flowing from the right hand side and the bottom. Other rules may specify sizes, orientations, centers, relative positioning, etc. based on information about diagrams or diagram elements. The information may be related to any of a number of different factors or conditions. For example, the information may be related to object shapes themselves as illustrated in the diamond decision box example above. Alternatively, the information may be related to how the diagram will be used, such as for what industry sector or business environment. The information may be related to hardware characteristics where a diagram is rendered, such as screen size, processor power, available memory, etc. Other factors may be used in various alternative embodiments.

Illustrating now an example, rules in a definition may specify use of a merged connection routing pattern when a node matches a "decision" pattern. A layout pattern may be defined by a pattern definition and a set of associated setters as will be discussed in more detail below. The pattern definition includes an enumeration of characteristics of diagrams, while the setters specify attributes that are applied to diagrams meeting the characteristic definitions.

Layout patterns may be scoped to a particular layout type. For example, a layout pattern may be scoped to a hierarchy or model type.

In addition to the definition of layout patterns through configuration of a given shape or line, default patterns can be defined for layout type and thereby be used in the absence of additional configuration. In some embodiments, this may be expressed through a hierarchy layout.

As will be described herein, embodiments may include functionality for defining pattern triggers based on any metadata property of a diagram element. For example, layout patterns may specify one or more of: number of connections, incoming vs. outcoming for a shape, direction of connection, general entity type, etc Additionally, embodiments may be implemented where patterns can be saved for reuse and combination with other patterns. In some embodiments, patterns may be organized hierarchically when used with other patterns. Some embodiments may allow for multiple patterns for a given situation and have patterns optionally triggered. Further, embodiments may include functionality configured to detect conflicts between patterns and to provide such information to a user.

The following discussion includes a number of examples illustrating different metadata properties and setters that may be specified in a layout pattern.

Users can define a pattern that triggers based on any information available to the diagram. Examples of some metadata are provided below. Notably however, this list is by no means exhaustive as other metadata, or other information may be used for a pattern definition. These metadata property examples will be used later herein to demonstrate defining patterns. It should be noted that while certain property names have been given here, other embodiments may implement different property names that define the same or similar properties to those illustrated below.

One property that is used in the examples illustrated herein is the OutgoingEdges property. This property defines the number of edges leaving a shape. In the present example, values of this property may be: 0, 1, or n, where n is a positive integer number. This property may have a default value assigned, such as 0, 1 or some other default value. Examples are illustrated in FIG. 1. FIG. 1 illustrates a source block or node 102, a decision block or node 104, and three activity blocks or nodes 106, 108 and 110. An OutgoingEdges property for the source node 102 may specify a property value of 1. An OutgoingEdges property for the decision node 104 may specify a property value of 3. An OutgoingEdges property for each of the activity nodes may specify property values of 0.

Another property that is used in the examples illustrated herein is the IncomingEdges property. This property defines the number of edges entering a shape. In the present example, values of this property may be: 0, 1, or n, where n is a positive integer number. This property may have a default value assigned, such as 0, 1 or some other default value. In the example illustrated in FIG. 1, each of the nodes, except the source node 102, may have an IncomingEdges property value of 1. The source node 102 may have an IncomingEdges property value of 0.

Another property that is used in the examples illustrated herein is the Depth property. This property defines the depth in the tree relative to a root node. In some embodiments, this property applies to directed diagrams only. For example, this property may apply to directed graphs. In the present example, values of this property may be any integer. The default value of this property may be any integer.

Another property that is used in the examples illustrated herein is the Orientation property. This property defines the current orientation of the shape or diagram.

Another property that is used in the examples illustrated herein is the IsRotated property. This property defines rotation state relative to parent node. In the present example, values of this property may be: TRUE or FALSE. If the property value is TRUE, then a node to which the property applies is rotated in "horse" fashion relative to a parent node. The default value of this property is False in this example.

Another property that is used in the examples illustrated herein is the IsSource property. This property specifies if the node is a source. In the present example, values of this property may be: TRUE or FALSE. If the property value is TRUE, then node is a source. The default value of this property is NULL in this example. For example, in FIG. 1, the source node 102 may have an IsSource property value of TRUE, while the other nodes 104-110 have IsSource vales of FALSE.

Figure 2:
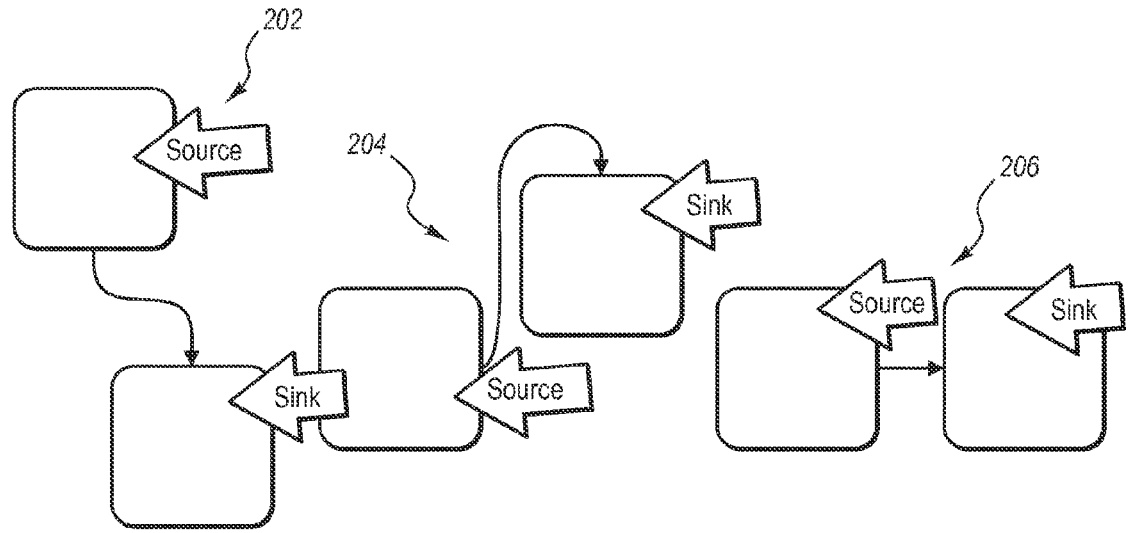
FIG. 2 illustrates relative Y positioning of a diagram layout.

Another property that is used in the examples illustrated herein is the RelativeTop property. This property specifies position of node relative to an associated node with respect to top-bottom arrangement, based on the center point of the two nodes. In the present example, values of this property may be: 1, 0, −1. If the value of this property is 1, the node to which it applies has a higher Y coordinate than the associated node. An example of this is illustrated by diagram 202 in FIG. 2. If the value of this property is −1, the node to which it applies has a lower Y coordinate than the associated node. An example of this is illustrated at diagram 204 in FIG. 2. If the value of this property is 0, then the node to which it applies has the same Y coordinate as the associated node. An example of this is illustrated by diagram 206 in FIG. 2. The default value of this property is NULL in this example. FIG. 2 illustrates examples of behaviors for different values for the RelativeTop property.

Figure 3:
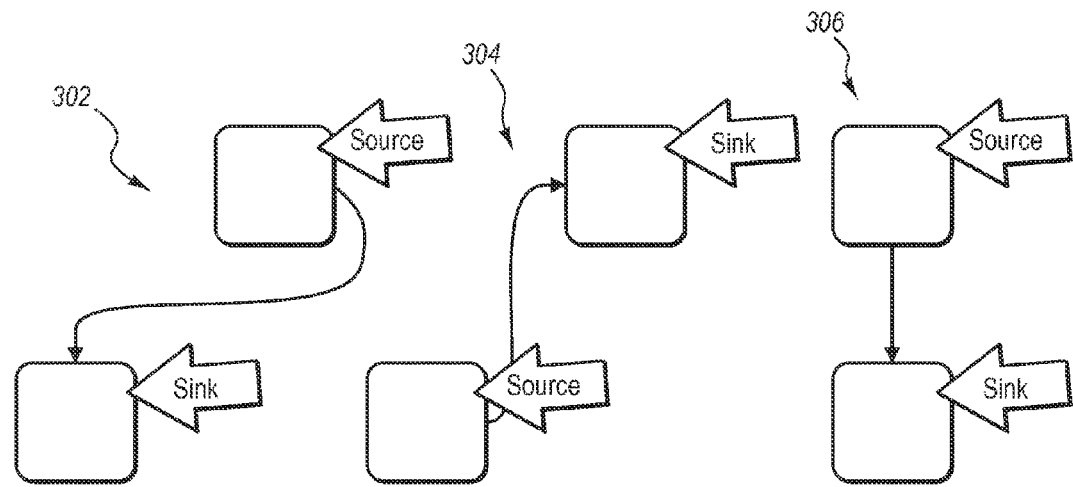
FIG. 3 illustrates relative X positioning of a diagram layout.

Another property that is used in the examples illustrated herein is the RelativeLeft property. This property is similar to the RelativeTop property, but with respect to left-right arrangement. In the present example, values of this property may be: 1, 0, −1. If this property has a value of 1, then the relevant node's X is greater than an associated node. An example of this is illustrated at 302. If this property has a value of −1, then the relevant node's X is less than associated node. An example of this is illustrated at 304 in FIG. 3. If this property has a value of 0, then the relevant node's X is equal to an associated node. An example of this is illustrated at 304 in FIG. 3. The default value for this property in the present examples is NULL.

Example pattern triggers are illustrated below. These are only representative and by no means exhaustive.

```
<LayoutTrigger Name="Decision"
    OutgoingEdges="0..n" IncomingEdges="0..1" IsSource="True"
RelativeTop="- 1">
    <Setter Property="SourceSide" Value="Bottom" />
    <Setter Property="SinkSide" Value="Top" />
    <Setter Property="ConnectionStyle" Value="Curved" />
    <Setter Property"ConnectionVariant" Value="Merged" />
</LayoutTrigger>
```

Figure 4:
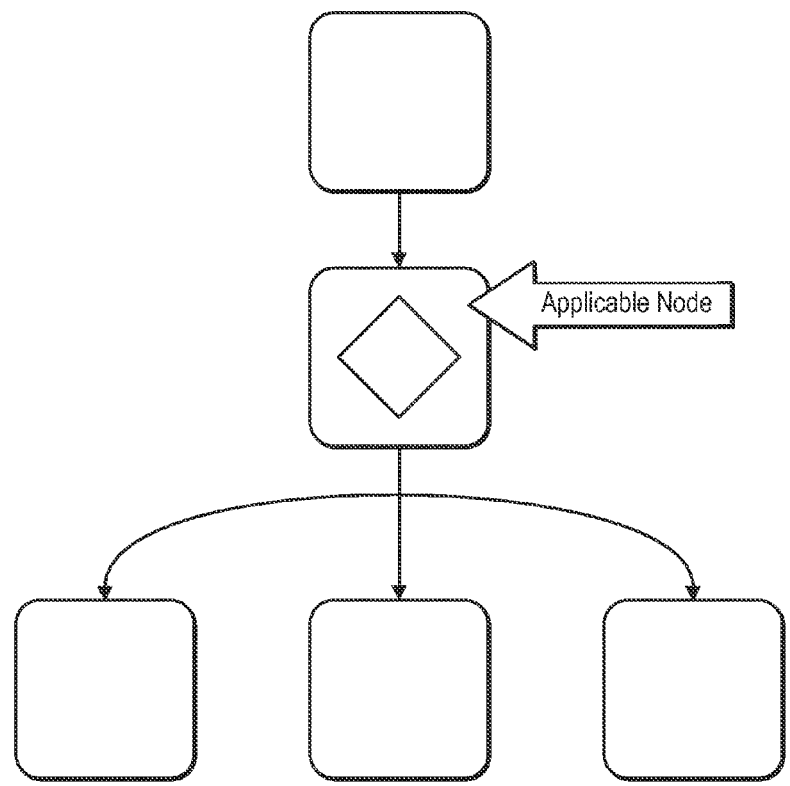
FIG. 4 illustrates an example diagram layout.

The preceding pattern trigger results in the diagram illustrated in FIG. 4. Another example is illustrated as:

```
<LayoutTrigger Name="Decision"
    OutgoingEdges="0..n" IncomingEdges="0..1" IsSource="True"
RelativeTop="- 1">
    <Setter Property="SourceSide" Value="Left" />
    <Setter Property="SinkSide" Value="Top" />
    <Setter Property="ConnectionStyle" Value="Curved" />
</LayoutTrigger>
```

Figure 5:
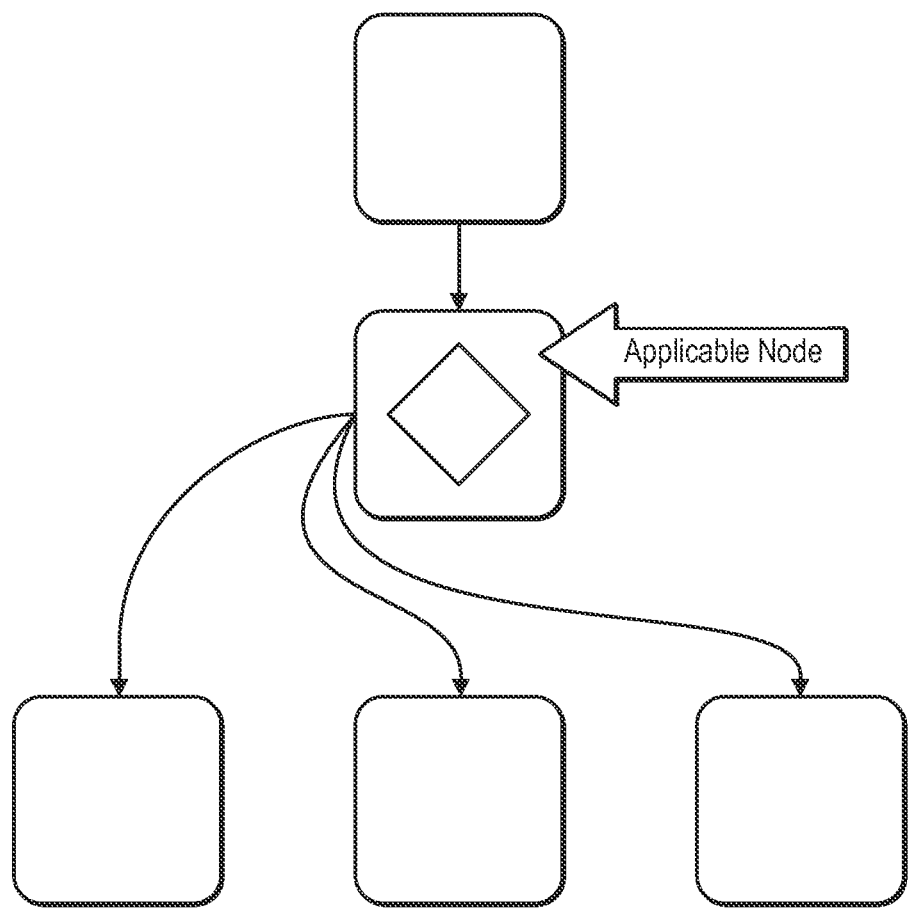
FIG. 5 illustrates an example diagram layout.

The preceding code results in the example illustrated in FIG. 5.

Any pattern that is constructed by the user can be saved and then reused in other diagrams or at different locations in the same diagram. As such it is safe to view patterns as isolated units that can be reused within the same context or be taken out of their original context and placed in a new context.

Patterns can be combined together to create higher-order patterns. For instance, users could take the above connection routing pattern and reuse it in a pattern that dictates shape alignment. Consider the following example which uses patterns defined previously as a field in a new pattern:

```
<MultiLayoutTrigger RelativeLeft="0">
    <PatternReference PatternName="Decision" />
    <Setter Property="Alignment" Value="CenterRelativeToParent" />
</MultiLayoutTrigger>
```

Just as patterns can be combined, they can also be applied separately to the same situation. For instance, the above pattern could have been broken down into two patterns, each for handling a different aspect of a diagram, one for handling line routing and the other for shape alignment. This is useful in complex diagrams where breaking down the patterns application helps the author deal with issues of scale.

On occasion pattern definitions will cause conflicts. For instance two or more patterns may match but "trigger" conflicting diagram layouts. Considering the above examples, pattern 1 could state . . .

```
<MultiLayoutTrigger RelativeLeft="0">
    <PatternReference PatternName="Decision" />
    <Setter Property="Alignment" Value="CenterRelativeToParent" />
</MultiLayoutTrigger>
``` while pattern 2 could state . . .

```
<MultiLayoutTrigger RelativeLeft="0">
    <PatternReference PatternName="Decision" />
    <Setter Property="Alignment" Value="LeftRelativeToParent" />
</MultiLayoutTrigger>
```

In such a case the system is able to fail gracefully. In one is example, a conflict is resolved by First "triggering" the last read pattern. Additionally embodiments may include functionality for surfacing an information message to the diagram layout system so that a visual or textual representation can be surfaced to the user.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 6:
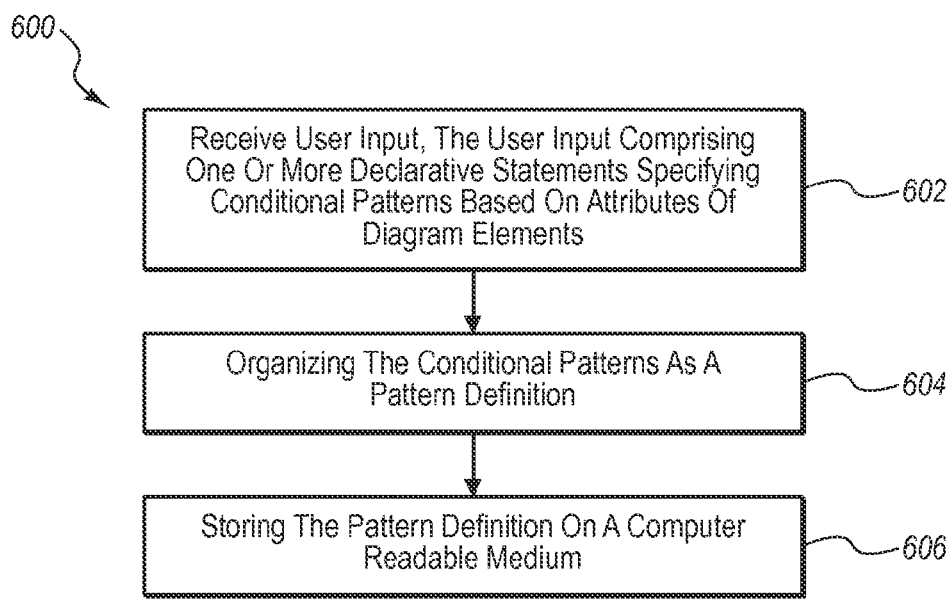
FIG. 6 illustrates a method including acts for creating and storing pattern definitions.

Referring now to FIG. 6, a method 600 is illustrated. The method included acts for defining a layout of diagram elements. The method includes receiving user input (act 602). The user input includes one or more declarative statements specifying conditional patterns based on attributes of diagram elements. The conditional patterns define layouts of diagram elements. Implementation of the layouts is dependent on conditions defined in the declarative statements and one or more values of one or more of the attributes. For example, in one embodiment a user may enter declarative statements into a command line user interface with the declarative statements specify the conditional patterns. An alternative embodiment, a user may use a wizard tool which outputs declarative statements specifying conditional patterns. Other alternatives may also be implemented.

The method 600 further includes organizing the conditional patterns as a pattern definition (act 604). For example, in one embodiment conditional patterns may be organized in a hierarchical format in a pattern definition to define how rules are applied.

The method 600 includes storing the pattern definition on a computer readable medium (act 606). The pattern definition is stored such that the pattern definition is retrievable by an application program that uses the pattern definition to evaluate the conditional patterns using values of attributes of one or more diagram elements. The application may be configured to display representations of the diagram elements according to the layouts when conditions for implementing the layouts are satisfied. For example, as discussed previously, an application may determine that a diagram is of a particular layout type. For example, a diagram may be a model type, a workflow instance, or a workpad instance. In one example, when an application determines that a diagram is, for example, a model type, then the application may consult the conditional patterns in the pattern definition to determine that elements should be oriented in a particular direction, that elements should be displayed to the right or left of other elements, that elements should be displayed above or below other elements, and/or that connectors, such as lines, and should extend from certain portions of elements.

As noted above, storing the pattern definition on a computer readable medium may include storing the pattern definition in a hierarchy of pattern definitions. In one embodiment, by storing the pattern definition in the hierarchy, the pattern definition can be used to implement diagram element layouts in the absence of other layout configuration information. In particular, if a parameter for a diagram layout pattern has not been defined, then a top or higher level pattern can be used to define a layout for elements of a diagram.

Figure 7:
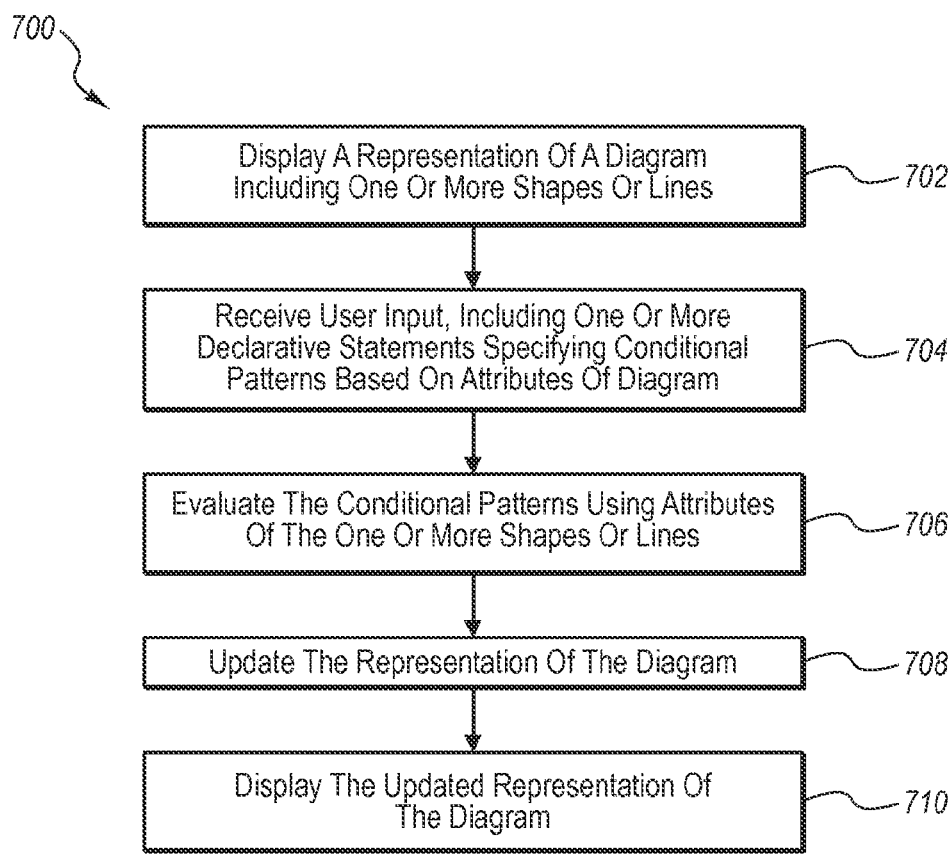
FIG. 7 illustrates a method including acts for updating diagram representations.

Referring now to FIG. 7, another example is illustrated. FIG. 7 illustrates a method 700 that may be practiced in a computing environment. The method 700 includes acts for facilitating defining a diagram layout. The method 700 includes displaying a representation of a diagram (act 702). The diagram includes one or more elements including one or more shapes or lines.

The method 700 further includes receiving user input (act 704). The user input includes one or more declarative statements specifying conditional patterns based on attributes of diagram elements. In one embodiment, a computing system may display a command line interface near the displayed representation of a diagram. A user can then enter declarative commands in the command line interface which are then applied to diagrams or diagram elements. In another embodiment, a computing system may display in a user interface declarative commands that are currently being used to define diagrammatic layout. The declarative commands may be editable, such that a user can insert or delete declarative commands, select portions of the commands to modify, and the like.

The method 700 further includes evaluating the conditional patterns using attributes of the one or more shapes or lines (act 706). For example, the conditional patterns may include information specifying shape type or diagram type. As noted, conditional patterns may specify decision diamonds or other shape types, workflows, or other diagram types, etc. The elements of the diagram can be evaluated against the specified shape type or diagram type.

The method 700 further includes updating the representation of the diagram based on evaluating the conditional patterns using attributes of the one or more shapes or lines (act 706) and displaying the updated representation of the diagram (act 706).

Embodiments of the method 700 may further include storing the one or more declarative statements as a pattern definition that can be applied to other diagrams. For example, the declarative statements may be stored in a data structure of a computer readable medium and used later for displaying representations of diagrams.

Figure 8:
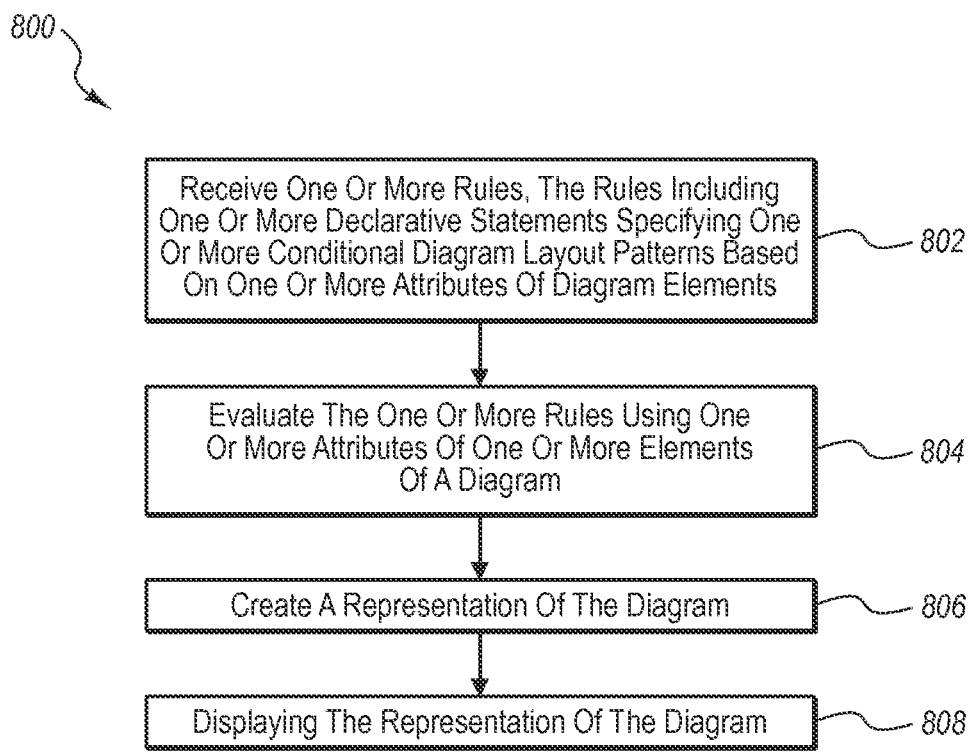
FIG. 8 illustrates a method including acts for evaluating rules and displaying representations.

Reference in now made to FIG. 8, which illustrates a method 800 which may be implemented in another embodiment. The method 800 may be practiced in a computing environment and includes acts for displaying diagrams. In particular, the method may include acts for using stored pattern definitions or otherwise received definitions to display representations of diagrams and diagram elements. The method includes receiving one or more rules, the rules comprising one or more declarative statements specifying one or more conditional diagram layout patterns based on one or more attributes of diagram elements (act 802). The method 800 further includes evaluating the one or more rules using one or more attributes of one or more elements of a diagram (act 802). As noted, this may include evaluating such attributes as shape type, line type, diagram type, etc. Based on evaluating the one or more rules using one or more attributes of one or more elements of the diagram, a representation of the diagram is created (act 802) and the representation of the diagram is displayed (act 802).

Embodiments of the method 800 may be practiced where at least a portion of the one or more attributes of one or more elements of the diagram are contained in metadata about one or more elements of the diagram.

As noted, receiving one or more rules may include receiving a pattern definition including the one or more rules. In some embodiments, the pattern definition may be scoped to a particular layout type, model type, workflow instance, or workpad instance. In some embodiments, the pattern definition is a default pattern definition used in the absence of one or more other pattern definitions.

Notably, embodiments of the method 800 may be practiced where evaluating the one or more rules includes evaluating the pattern definition in conjunction with one or more additional pattern definitions. Each of the one or more additional pattern definitions includes one or more rules comprising one or more declarative statements specifying one or more conditional diagram layout patterns based on one or more attributes of diagram elements. When multiple pattern definitions are used, there is a chance for conflicts between the rules. Thus, some embodiments of the method 800 may further include detecting that the pattern definition conflicts with one or more of the additional pattern definitions and providing an indication to a user indicating that the pattern definition conflicts with one or more of the additional pattern definitions. In addition to and/or alternatively, embodiments may include provisions for resolving detected conflicts. For example, the method 800 may include resolving the detected conflict and selecting one of the pattern definition or one of the one or more additional pattern definitions to resolve the conflict. In one embodiment, resolving the detected conflict includes selecting a pattern definition that was read last in a multiple pattern definition.

The method 800 may also include selecting the pattern definition from among a number of pattern definitions specified for a given condition. The act of evaluating the one or more rules using one or more attributes of one or more elements of a diagram is performed as a result of selectively triggering the pattern definition. In other words, embodiments may be practiced where one pattern definition may be selected from among a number of different pattern definitions. In some embodiments, a user may be able to select a definition by declarative command, by interacting with a graphical user interface such as by selecting radio or check boxes or using pull-down menu selections, or with other user interfaces.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   at least one processor; and
   one or more storage medium having stored computer-executable instructions which, when executed by the at least one processor, implement a method of defining a layout of diagram elements, the method comprising:
   a computer system, which includes a processor, receiving user input, the user input comprising one or more declarative statements specifying conditional patterns based on attributes of diagram elements, the conditional patterns defining layouts of diagram elements, wherein implementation of the layouts is dependent on conditions defined in the declarative statements and one or more values of one or more of the attributes;
   the computer system organizing the conditional patterns as a pattern definition, wherein organizing the conditional patterns as a pattern definition comprises at least one of:
      combining conditional patterns together to create a higher order pattern with a previously defined pattern being included in a new pattern as a definition field, or
      breaking down a conditional pattern into the two or more patterns which are both applied to a same situation, but which define different aspects of a diagram; and
   the computer system storing the pattern definition on a computer readable medium, wherein the pattern definition is stored such that the pattern definition is retrievable by an application program that uses the pattern definition to evaluate the conditional patterns using values of attributes of one or more diagram elements, the application further being configured to display representations of the diagram elements according to the layouts when conditions for implementing the layouts are satisfied.

2. The system of claim 1, wherein storing the pattern definition on a computer readable medium comprises storing the pattern definition in a hierarchy of pattern definitions such that the pattern definition is used to implement diagram element layouts in the absence of other layout configuration information.

3. The system of claim 1, wherein at least one of the attributes of diagram elements comprises a layout type to which the diagram element belongs.

4. The system of claim 1, wherein organizing the conditional patterns as a pattern definition comprises combining the conditional patterns together to create one or more higher order patterns.

5. The system of claim 1, wherein organizing the conditional patterns as a pattern definition comprises breaking down the conditional patterns into the two or more patterns.

6. A computing system comprising:
   at least one processor; and
   one or more storage medium having stored computer-executable instructions which, when executed by the at least one processor, implement a method for facilitating defining a layout of diagram elements, the method comprising:
   displaying a representation of a diagram that includes one or more elements comprising one or more shapes or lines;
   displaying a command line interface that is operable to receive typed input comprising one or more declarative statements, the command line interface being displayed near the displayed representation of the diagram;
   receiving user input at the command line interface, the user input comprising the one or more declarative statements specifying conditional patterns based on attributes of diagram elements;

evaluating the conditional patterns using attributes of the one or more shapes or lines;

updating the representation of the diagram based on evaluating the conditional patterns using attributes of the one or more shapes or lines; and displaying the updated representation of the diagram.

7. The system of claim 6, wherein the method further comprises storing the one or more declarative statements as a pattern definition that can be applied to other diagrams.

8. The system of claim 6, wherein the method further includes receiving user input, the user input comprising one or more declarative statements specifying conditional patterns based on attributes of diagram elements comprises receiving conflicting user input, the method further comprising surfacing the conflict to the user.

9. The system of claim 6, wherein the method further includes receiving user input, the user input comprising one or more declarative statements specifying conditional patterns based on attributes of diagram elements comprises receiving conflicting user input, the method further comprising resolving the conflict by using the last read user input.

10. A computing system comprising:
at least one processor; and
one or more storage medium having stored computer-executable instructions which, when executed by the at least one processor, implement a method for displaying diagrams, the method comprising:
receiving one or more rules, the rules comprising one or more declarative statements specifying one or more conditional diagram layout patterns based on one or more attributes of diagram elements, wherein the one or more rules are scoped to either a particular use or particular hardware;
identifying the particular use or hardware that applies to a current situation for displaying a representation of a diagram;
selecting the one or more rules based on a determination that the one or more rules correspond to the current situation;
evaluating the one or more selected rules using one or more attributes of one or more elements of a diagram;
based on evaluating the one or more selected rules using one or more attributes of one or more elements of the diagram, creating a representation of the diagram; and
displaying the representation of the diagram.

11. The system of claim 10, wherein at least a portion of the one or more attributes of one or more elements of the diagram are contained in metadata about one or more elements of the diagram.

12. The system of claim 10, wherein receiving one or more rules comprises receiving a pattern definition including the one or more rules and wherein the pattern definition is scoped to a particular layout type, model type, workflow instance, or workpad instance.

13. The system of claim 10, wherein receiving one or more rules comprises receiving a pattern definition including the one or more rules and wherein the pattern definition is a default pattern definition used in the absence of one or more other pattern definitions.

14. The system of claim 10, wherein the one or more rules are scoped to the particular use as well as the particular hardware, and such that the selection of the one or more rules includes selecting the one or more rules based on the particular use as well as the particular hardware that correspond to the current situation for displaying the representation of the diagram.

15. The system of claim 10, wherein receiving one or more rules comprises receiving a pattern definition including the one or more rules and wherein evaluating the one or more rules comprises evaluating the pattern definition in conjunction with one or more additional pattern definitions, and wherein each of the one or more additional pattern definitions comprises one or more rules comprising one or more declarative statements specifying one or more conditional diagram layout patterns based on one or more attributes of diagram elements.

16. The system of claim 15, the method further comprising:
detecting that the pattern definition conflicts with one or more of the additional pattern definitions;
providing an indication to a user indicating that the pattern definition conflicts with one or more of the additional pattern definitions; and
selecting one of the pattern definition or one of the one or more additional pattern definitions to resolve the conflict.

17. The system of claim 15, wherein evaluating the one or more rules using one or more attributes of one or more elements of a diagram is performed as a result of selectively triggering the pattern definition.

18. One or more hardware storage device having stored computer-executable instructions which, when executed by at least one processor, implement a method of defining a layout of diagram elements, the method comprising:
a computer system, which includes a processor, receiving user input, the user input comprising one or more declarative statements specifying conditional patterns based on attributes of diagram elements, the conditional patterns defining layouts of diagram elements, wherein implementation of the layouts is dependent on conditions defined in the declarative statements and one or more values of one or more of the attributes;
the computer system organizing the conditional patterns as a pattern definition, wherein organizing the conditional patterns as a pattern definition comprises at least one of:
combining conditional patterns together to create a higher order pattern with a previously defined pattern being included in a new pattern as a definition field, or
breaking down a conditional pattern into the two or more patterns which are both applied to a same situation, but which define different aspects of a diagram; and
the computer system storing the pattern definition on a computer readable medium, wherein the pattern definition is stored such that the pattern definition is retrievable by an application program that uses the pattern definition to evaluate the conditional patterns using values of attributes of one or more diagram elements, the application further being configured to display representations of the diagram elements according to the layouts when conditions for implementing the layouts are satisfied.

19. One or more hardware storage device having stored computer-executable instructions which, when executed by at least one processor, implement a method for facilitating defining a layout of diagram elements, the method comprising:
displaying a representation of a diagram that includes one or more elements comprising one or more shapes or lines;
displaying a command line interface that is operable to receive typed input comprising one or more declarative statements, the command line interface being displayed near the displayed representation of the diagram;

receiving user input at the command line interface, the user input comprising the one or more declarative statements specifying conditional patterns based on attributes of diagram elements;

evaluating the conditional patterns using attributes of the one or more shapes or lines;

updating the representation of the diagram based on evaluating the conditional patterns using attributes of the one or more shapes or lines; and displaying the updated representation of the diagram.

20. One or more hardware storage device having stored computer-executable instructions which, when executed by at least one processor, implement a method for displaying diagrams, the method comprising:

receiving one or more rules, the rules comprising one or more declarative statements specifying one or more conditional diagram layout patterns based on one or more attributes of diagram elements, wherein the one or more rules are scoped to either a particular use or particular hardware;

identifying the particular use or hardware that applies to a current situation for displaying a representation of a diagram;

selecting the one or more rules based on a determination that the one or more rules correspond to the current situation;

evaluating the one or more selected rules using one or more attributes of one or more elements of a diagram;

based on evaluating the one or more selected rules using one or more attributes of one or more elements of the diagram, creating a representation of the diagram; and displaying the representation of the diagram.

\* \* \* \* \*